United States Patent [19]

Engelskirchen et al.

[11] Patent Number: 5,238,533
[45] Date of Patent: Aug. 24, 1993

[54] FLOTATION PROCESS FOR REMOVING FILLERS FROM WASTEPAPER IN THE PRESENCE OF POLYMERS AND COPOLYMERS

[75] Inventors: Konrad Engelskirchen, Meerbusch; Herbert Fischer, Duesseldorf; Klaus Hornfeck, Mettmann; Doris Oberkobusch, Duesseldorf; Ludwig Schieferstein, Ratingen, all of Fed. Rep. of Germany

[73] Assignee: Henkel Kommanditgessellschaft auf Aktien, Duesseldorf, Fed. Rep. of Germany

[21] Appl. No.: 836,315

[22] PCT Filed: Aug. 22, 1990

[86] PCT No.: PCT/EP90/01396
§ 371 Date: Feb. 28, 1992
§ 102(e) Date: Feb. 28, 1992

[87] PCT Pub. No.: WO91/03597
PCT Pub. Date: Mar. 21, 1991

[30] Foreign Application Priority Data

Aug. 31, 1989 [DE] Fed. Rep. of Germany ....... 3928842

[51] Int. Cl.$^5$ ................................................. D21C 5/02
[52] U.S. Cl. .......................................... 162/5; 162/55; 210/928
[58] Field of Search ............... 162/4, 5, 55; 210/928, 210/929

[56] References Cited

U.S. PATENT DOCUMENTS

| | | | |
|---|---|---|---|
| 4,347,099 | 8/1982 | De Ceuster et al. | 162/5 |
| 4,360,402 | 11/1982 | Ortner et al. | 210/928 |
| 4,780,179 | 10/1988 | Clement | 162/8 |

*Primary Examiner*—Peter Chin
*Assistant Examiner*—Dean Tan Nguyen
*Attorney, Agent, or Firm*—Ernest G. Szoke; Wayne C. Jaeschke; Norvell E. Wisdom, Jr.

[57] ABSTRACT

The invention relates to a process for the removal of fillers from waste paper, after floatation of the printing ink, in the presence of at least partly water-soluble polymers and/or copolymers having number average molecular weights of 1,000 to 500,000 by flotation.

20 Claims, No Drawings

FLOTATION PROCESS FOR REMOVING FILLERS FROM WASTEPAPER IN THE PRESENCE OF POLYMERS AND COPOLYMERS

BACKGROUND OF THE INVENTION

1. Field of the Invention

This invention relates to a process for the removal of fillers from wastepaper.

According to the invention at least partly water-soluble polymers and/or copolymers having number average molecular weights of 1,000 to 500,000 are used for the removal of fillers from wastepaper.

2. Statement of Related Art

Fillers are added to almost all papers to improve their printability, their density, and their opacity and to obtain a more uniform appearance and greater whiteness. The fillers used are mineral by nature or are chemically precipitated products, for example aluminum silicates, such as kaolins or siliceous alumina, calcium carbonates, such as chalk or lime, talcum, calcium sulfate and/or barium sulfate (*Ullmanns Encyklopadie der technischen Chemie* 17, 577 et seq. (1979)). The filler content of the paper stock depends on the purpose for which the paper is to be used and, in most cases, is between 7 and 25% by weight. To be able to produce a paper having standardized quality features, it is essential that the starting materials and auxiliaries used to make the paper are of uniform quality.

Printed wastepaper is used in large quantities in the production of printing paper and tissue paper. To obtain high whiteness, the printing inks have to be removed from printed wastepaper. This is done by deinking processes essentially comprising two steps, namely:
1. refining the wastepaper, i.e. fiberizing in water in of the printing ink particles and
2. removal of the detached printing ink particles from the fiber suspension.

The second step can be carried out by washing or flotation (*Ullmanns Encyklopadie der technischen Chemie*, 4th Edition, Vol. 17, pages 570-571 (1979)). In flotation, which utilizes the difference in wettability between printing inks and paper fibers, air is forced or drawn through the paper stock suspension. Small air bubbles attach themselves to the printing ink particles and form a froth at the surface of the water which is removed by clarifiers.

The deinking of wastepaper is normally carried out at alkaline pH values in the presence of alkali hydroxides, alkali silicates, oxidative bleaches and surfactants at temperatures in the range from 30° to 50 ° C. Soaps and/or fatty alcohol polyglycol ethers are often used as surfactants which are responsible for the detachment and separation of the printing inks (*Ullmanns Encyklopa die der technischen Chemie*, 4th Edition, Vol. 17, pages 571-572 (1979)).

Unfortunately, the known processes for separating the detached printing ink particles from the paper stock suspensions have serious disadvantages. The high filler component of wastepaper is only very incompletely removed by flotation, so that the proportion of deinked wastepaper is limited to around 50% by weight in paper manufacture, particularly in the manufacture of newsprint paper. Although the fillers present in wastepaper are removed by washing of the paper fibers, there is the disadvantage of a very high fiber loss and very serious water pollution.

It is known from *Wochenblatt fur Papierfabrikation* 17, 646-649 (1985) that the removal of fillers by flotation can be increased if the wastepaper is treated with aqueous liquors containing alkyl benzenesulfonates in particular as surfactants and not with aqueous liquors containing soaps or nonionic surfactants. In many cases, however, the improvement in filler removal is not sufficient to meet the stringent requirements which the quality of reusable wastepaper has to satisfy.

DESCRIPTION OF THE INVENTION

Object of the Invention

Accordingly, the problem addressed by the present invention was to develop a process with which a distinct increase could be obtained in the removal of fillers from wastepaper.

SUMMARY OF THE INVENTION

The invention is based on the surprising observation that the removal of fillers from aqueous paper stock suspensions is distinctly increased in the presence of at least partly water-soluble polymers and/or copolymers having number average molecular weights in the range from 1,000 to 500,000.

Accordingly, the present invention relates to a process for the removal of fillers from wastepaper which is characterized in that, after flotation of the printing ink, at least partly water-soluble polymers and/or copolymers having number average molecular weights in the range from 1,000 to 500,000, prepared by polymerization or copolymerization of monomers containing amino groups or by reaction of polymers containing carboxyl, ester, and/or anhydride groups with amino alcohols and/or diamines are added to the aqueous paper stock suspensions in a total quantity of from 0.1 to 8 g/kg air-dry paper stock, followed by flotation in known manner.

The present invention also relates to the use of at least partly water-soluble polymers and/or copolymers having number average molecular weights in the range from 1,000 to 500,000, prepared by polymerization or copolymerization of monomers containing amino groups or by reaction of polymers containing carboxyl, ester and/or anhydride groups with amino alcohols and/or diamines for the removal of fillers from wastepaper by flotation.

Air-dry paper stock is paper stock in which an equilibrium state of internal moisture has been established. This is dependent on the temperature and relative humidity of the air.

"Fillers" are understood to be the substances typically used in the paper industry, for example aluminium silicates, such as kaolins or siliceous alumina, and/or calcium carbonates, such as chalk or lime.

"At least partly water-soluble" means that more than 0.01% by weight of the polymers and/or copolymers dissolves in water at the in-use pH value to form clear or clouded solutions.

DESCRIPTION OF PREFERRED EMBODIMENTS

According to the invention, 1 to 4 g of polymers and/or copolymers per kg air-dry paper stock are preferably added to the aqueous paper stock suspensions at 20° to 60° C. after flotation of the printing ink. The polymers and/or copolymers added to the aqueous paper stock suspensions have number average molecular weights preferably in the range from 1,000 to 200,000 and, more preferably, in the range from 1,000 to 100,000. The pH value of the suspensions is between 7 and 11 and preferably between 8 and 10. The paper stock content of the suspensions is, for example, from 0.5 to 2% by weight. The suspensions are then flotated in known manner at temperatures of 20° to 95 ° C. and preferably at temperatures of 45° to 60 ° C., for example in a Denver flotation cell.

The polymers and/or copolymers to be used in accordance with the invention may be obtained by polymerization of A. amino group containing monomers corresponding to general formula I

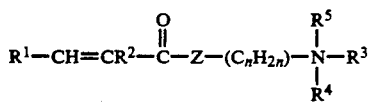

in which $R^1$ and $R^2$ represent hydrogen or methyl, $R^3$ and $R^4$ represent hydrogen or a $C_{1-4}$ alkyl radical or a piperazine, piperidine or morpholine group, $R^5$ is a linear or branched $C_{1-22}$ alkyl radical, with the proviso that the counterion to the ammonium function is a halogen, sulfate, phosphate, borate or organic acid anion, or $R^5$ is an electron pair, Z represents O or NH and n is a number of 2 to 5, or by copolymerization of A. with B1. monomeric, unsaturated acids corresponding to general formula II

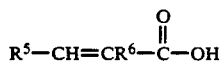

in which $R^5$ and $R^6$ each represent a hydrogen atom or a methyl group, and/or B2. monomeric, unsaturated carboxylic acid esters corresponding to general formula III

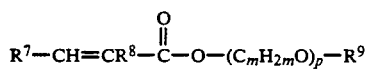

in which $R^7$ and $R^8$ each represent a hydrogen atom or a methyl group and $R^9$ is a linear or branched $C_{1-22}$ alkyl group, m is a number of 2 to 4 and p is a number of 0 to 18, with the proviso that, where p=0, the content of unsaturated carboxylic acid esters in the copolymer does not exceed 30% by weight, and/or B3. acrylamides and/or methacrylamides which may be substituted at the amide nitrogen atoms by linear and/or branched $C_{1-22}$ alkyl radicals, and/or B4. N-vinyl pyrrolidone.

Suitable monomers containing amino groups corresponding to general formula I are, in particular, those in which $R^1$ is hydrogen, $R^2$ is hydrogen or methyl, $R^3$ and $R^4$ each represent methyl or ethyl, $R^5$ represents an electron pair or $R^5$ is a $C_{1-4}$ alkyl group, with the proviso that the counterion to the ammonium function is a halogen anion, and Z represents 0 or NH and n is a number of 2 to 5, for example dimethylaminoethyl methacrylate, dimethylaminoethyl acrylate, dimethylaminopropyl methacrylamide, dimethylaminoneopentyl acrylate, diethylaminoethyl acrylate, diethylaminoethyl methacrylate and/or methacrylamidopropyl trimethyl ammonium chloride. Acrylic acid and/or methacrylic acid are preferably used as the monomeric unsaturated acids corresponding to general formula II.

Monomeric unsaturated carboxylic acid esters corresponding to general formula III, in which $R^9$ is preferably a linear or branched $C_{1-8}$ alkyl group, are for example ethyl acrylate, methyl methacrylate, butyl acrylate, butyl methacrylate, octyl acrylate and/or butyl 3 mol ethylene oxide acrylate. In addition, acrylamide, methacrylamide, N-ethyl acrylamide and/or tert-butyl acrylamide are suitable for copolymerization with monomers containing amino groups corresponding to general formula I.

The polymerization or copolymerization of the monomers containing amino groups corresponding to general formula I is carried out by polymerization processes known per se in aqueous media optionally containing water-miscible solvents, such as alcohols, for example isopropanol (*Ullmanns Encyclopadie der technischen Chemie*, 4th Edition, Vol. 19, pages 3–4, Verlag Chemie Weinheim, 1980). A radical-forming compound, for example potassium or ammonium peroxysulfate, tert-butyl hydroperoxide, azo-bis-(cyanopentanoic acid), azo-bis-(isobutyronitrile) or 2,2'-azo-bis-(2-amidinopropane dihydrochloride), is used in small quantities as initiator. The polymerization or copolymerization of the monomers containing amino groups corresponding to general formula I may be carried out, for example, by simultaneously adding the monomers containing amino groups corresponding to general formula I and, optionally, monomers of groups B1, B2, B3 and/or B4 dropwise to water containing the initiator. The polymerization temperature may vary over a wide range. Temperatures in the range from 60° to 100° C. may be optimal, depending on the initiator used. Aqueous polymer and/or copolymer solutions having polymer contents of, for example, from 10 to 60% by weight are obtained.

High removal of fillers by flotation is also obtained when the at least partly water-soluble polymers and/or copolymers are prepared by reaction of polymers containing carboxyl groups and/or ester groups corresponding to the general formula —COOR, in which R is a $C_{1-8}$ alkyl group or an aromatic group, and/or —CO—O—CO— groups with—based on the carboxyl, ester and/or latent carboxyl groups present in the polymers.

D1. 0 to 1 equivalent of amino alcohols corresponding to general formula IV

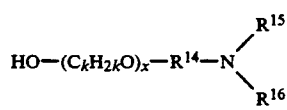

in which $R^{14}$ is a $C_{1-8}$ alkyl group or an aromatic group, $R^{15}$ and $R^{16}$ are the same or different and represent $C_{1-4}$ alkyl groups or aromatic groups or $R^{15}$ and $R^{16}$ together represent $CH_2CH_2$—O—$CH_2CH_2$, k=2, 3 and/or 4 and x is a number of 0 to 10, D2. 0 to 1 equivalent of diamines corresponding to general formula V

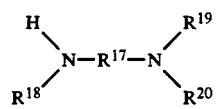

in which $R^{17}$ is a $C_{1-8}$ alkyl group or an aromatic group, $R^{18}$ is H or a $C_{1-4}$ alkyl group and $R^{19}$ and $R^{20}$ may be the same or different and represent $C_{1-4}$ alkyl groups or $R^{19}$ and $R^{20}$ together represent —CH=CH—N=CH—, 0 to 0.5 equivalent of alcohols corresponding to general formula VI $$HO—(C_iH_{2i}O)_y—R^{21}$$

in which $R^{21}$ is a $C_{6-22}$ alkyl group or an aromatic group, i=2, 3 and/or 4 and y is a number of 0 to 30, and D4. 0 to 0.5 equivalent of amines corresponding to general formula VII

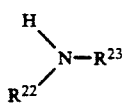

in which $R^{22}$ is H or a $C_{1-4}$ alkyl group and $R^{23}$ is a $C_{6-22}$ alkyl group or an aromatic group, with the proviso that the sum of the equivalents of components D1 and D2 is not 0.

Anhydride groups which may be present in the polymers according to the invention contain two latent carboxyl groups per anhydride group.

Polymers containing carboxyl, ester and/or anhydride groups with - based on the carboxyl, ester and/or latent carboxyl groups present in the polymers D1. 0 to 1 equivalent of amino alcohols,
D2. 0 to 1 equivalent of diamines,
D3. 0 to 0.2 equivalent of alcohols and
D4. 0 to 0.2 equivalent of amines, with the proviso that the sum of the equivalents of components D1 and D2 is from 0.7 to 1, are preferably used.

Polymers containing carboxyl, ester and/or anhydride groups preferably contain structural units corresponding to the general formulae

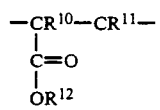 C1.

and/or

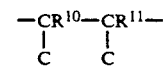 C2.

and/or

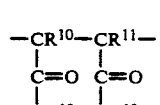 C3.

in which $R^{10}$ and $R^{11}$ may be the same or different and represent H or a methyl group and $R^{12}$ and $R^{13}$ may be the same or different and represent H, $C_{1-8}$ alkyl groups or aromatic groups.

Polymers containing only structural units corresponding to general formula C1 are particularly preferred.

The polymers containing carboxyl, ester and/or anhydride groups required for the preparation of polymers to be used in accordance with the invention may be prepared by known polymerization processes in organic solvents, such as hexane, octane, toluene, xylene and/or ketones. Suitable monomers are, for example, acrylic acid, methacrylic acid, crotonic acid, $C_{1-8}$ alkyl esters of the above-mentioned acids, aryl esters of the above-mentioned acids, maleic anhydride, maleic acid, fumaric acid, mono-$C_{1-8}$-alkyl esters of the above-mentioned acids, di-$C_{1-8}$-alkyl esters of the above-mentioned acids and also the corresponding aryl esters. The alkyl group of the alcohol radicals in the esters may be linear, branched or cyclic. A monomer or mixture of monomers may be used. Acrylic acid, methacrylic acid, acrylates and/or methacrylates are preferred as monomers. Other suitable monomers are styrene, alkyl styrenes, 4-vinyl pyridine, 4-vinyl pyrrolidone, acrylonitrile, acrylide, methacrylamide, vinyl chloride and/or vinylidene chloride. The polymerizations are carried out in the presence of radical-forming agents, for example dibenzoyl peroxide and/or azo-bis-isobutyronitrile, under normal pressure at temperatures in the range from 60° to 150° C.

The reactions of the polymers containing carboxyl, ester and/or anhydride groups with amino alcohols and/or diamines and, optionally, alcohols and/or amines are carried out in the presence or absence of organic solvents, preferably in the presence of catalysts, such as sulfuric acid, p-toluene sulfonic acid, dibutyl tin dilaurate, tin and/or alkali alcoholates, at temperatures in the range from 100° to 230 ° C. The water formed during the esterification and/or amidation reaction and-/or the alcohols formed are removed by distillation. Suitable organic solvents are, for example, aliphatic and/or aromatic hydrocarbons having boiling points above 100° C.

Suitable amino alcohols corresponding to general formula IV are, for example, 2-dimethylaminoethanol, 2-diethylaminoethanol, 3-dimethylamino-2,2-dimethyl-1-propanol,4-(dimethylamino)-1-butanol, 6-(dimethylamino)-1-hexanol, 2-[2-(dimethylamino)-ethoxy]-ethanol, 2-cibutylaminoethanol, 3-dimethylamino-1-propanol, 3-diethylamino-1-propanol, 4-dimethylaminophenol, 3-diethylaminophenol, N-hydroxyethyl-N-methyl aniline, N-hydroxyethyl-N-ethyl aniline, N-n-butyl-N-hydroxyethyl aniline and/or 4-(2-hydroxyethyl)morpholine. Examples of diamines corresponding to general formula V are N,N-dimethylaminopropyamine, N,N-diethylaminopropylamine, N,N-diethylaminoethylamine, 1-diethylamino-4-aminopentane, N,N-dimethyl-p-phenylenediamine, N,N-diethyl-p-phenylenediamine and/or 1-(3-aminopropyl)-imidazole.

The reactions of polymers containing carboxyl, ester and/or anhydride groups with amino alcohols and/or diamines may be carried out in the presence of alcohols corresponding to general formula VI and/or amines corresponding to general formula VII. The alkyl groups which may be present in the alcohols and/or amines may be linear, branched and/or cyclic. Examples of alcohols corresponding to general formula VI are cyclohexanol, 2-ethyl hexanol, octanol, dodecanol, tetradecanol, hexadecanol, octadecanol, docosanol, tallow alcohol containing 12 mol ethylene oxide and/or benzyl alcohol. Examples of amines corresponding to general formula VII are hexyl amine, 2-ethyl hexyl amine, octyl amine, decyl amine, dodecyl amine, tetradecyl amine, hexadecyl amine, octadecyl amine, docosyl amine, coconut oil amine and/or tallow amine.

In a particularly preferred embodiment, polymers bearing carboxyl, ester and/or anhydride groups which contain structural units corresponding to general formula C1, in which $R^{10}$ is H, $R^1$ is H or a methyl group and $R^{12}$ is H or a $C_{1-4}$ alkyl group, are reacted with aminoalcohols and/or diamines.

According to the invention, fillers can be removed from wastepaper with at least partly water-soluble polymers and/or copolymers prepared by polymerization or copolymerization and/or at least partly water-soluble polymers prepared by reaction of polymers containing carboxyl, ester and/or anhydride groups with amino alcohols and/or diamines. In many cases, the removal of fillers from the wastepaper can be considerably increased if at least partly water-soluble polymers and/or copolymers are used in combination with at least partly water-soluble polymers bearing amino groups and/or ammonium groups and having number average molecular weights of 2,000 to 500,000. In these mixtures, the ratio by weight of at least partly water-soluble polymers and/or copolymers to at least partly water-soluble polymers bearing amino and/or ammonium groups is from 10:1 to 1:10 and preferably from 5:1 to 1:5. The mixtures are added to paper stock suspensions in quantities of 0.1 to 8 g and preferably in quantities of 1 to 4 g per kg air-dry paper stock. Examples of at least partly water-soluble polymers bearing amino and/or ammonium groups are polyethylene imines, copolymers containing ethylene imine, polymers and/or copolymers based on 2-vinyl pyridine, 4-vinyl pyridine and/or 1-vinyl imidazole, polysaccharides and/or heteropolysaccharides containing primary, secondary, tertiary and/or quaternary amino groups, for example celluloses, hydroxyethyl celluloses, starches, chitosan and/or guar containing primary, secondary, tertiary and/or quaternary amino groups, proteins and mixtures of these polymers.

The fibrous material obtained by the process according to the invention is distinguished from fibrous material floated in the presence of typical surfactants by distinctly lower filler contents. It is now possible by the process according to the invention to increase the proportion of deinked wastepaper in paper manufacture to more than 50% by weight.

EXAMPLES

Preparation of polymer I 170 mg of 2,2'-azo-bis-(2-amidinopropane dihydrochloride) and 36.8 g of water were introduced into a reactor equipped with a stirrer, two feed vessels, a heating and cooling system, a reflux condenser and a thermometer. 42 g dimethylaminoethyl methacrylate were introduced into one feed vessel (feed vessel 1) while a solution of 330 mg of 2,2'-azo-bis-(2-amidinopropane dihydrochloride) and 4 g of water was introduced into the other feed vessel. After the solution in the reactor had been heated with stirring to 75° C., both feed solutions were added at the same time over a period of 90 minutes. After the addition, the mixture was stirred for 60 minutes at 80° C and, after cooling to around 45° C., was neutralized with 16.7 g of a 50% by weight formic acid.

Brookfield viscosity of the clear, 50% by weight aqueous solution obtained (as measured with spindle 5 at 20 revolutions per minute, temperature=25° C.): 18,000 mPas.

Preparation of polymer II 108 g dried polyacrylic acid (Good-rite K 722, a product of Goodrich), 204.4 g dimethylaminopropyl amine and 300 g N-methyl pyrrolidone were introduced into a reactor equipped with a nitrogen inlet, a vertical steam-heatable Liebig condenser and a descending condenser and heated to 170° C. The water of reaction began to distill off. The temperature was gradually increased to 230° C. and was maintained until the elimination of water was complete. After cooling to 100° C., N-methyl pyrrolidone was removed by distillation in vacuo. The polymer obtained was dissolved in such a quantity of water that the polymer content was 1% by weight.

Preparation of copolymer I

Copolymer I was prepared in the same way as polymer I except that 36.8 g of water instead of 53.5 g was introduced into the reactor and a mixture of 39 g of dimethylaminoethyl methacrylate, 7.5 g ethyl acrylate and 3.5 g of methacrylic acid was introduced into feed vessel 1. The neutralization step was left out. Brookfield viscosity of the opaque 50% by weight solution obtained (measured with spindle 5 at 20 revolutions per minute, temperature=25° C.): 33,000 mPas.

Preparation of copolymer II 32 0 g of acrylic acid
106.7 g of 30% by weight sulfuric acid
976.0 g of water and
217.6 g of dimethylaminoethyl methacrylate
46.2 g of methyl methacrylate
1.1 g of azo-bis-(isobutyronitrile) and
263.0 g of isopropanol were separately premixed, introduced into a reaction vessel equipped with a stirrer, heating system and reflux condenser, heated to 65° C. and then stirred for 30 minutes at that temperature, for one hour at 70° C. and for one hour at 80° C. Characteristic data of the clear 20% by weight aqueous-isopropanolic solution obtained: specific viscosity of a 1% by weight polymer solution in 1N $NaNO_3$ solution: 1.28.

APPLICATION EXAMPLES

Flotation was carried out in an approximately 9 liter Denver laboratory flotation cell using aqueous filler suspensions and aqueous paper stock suspensions.

EXAMPLE 1

Filler suspensions 23 g of fillers were dispersed in 9 l of water and the resulting dispersion adjusted with sodium hydroxide to a pH value of 8.5 to 9.0. After the addition of 0.2 g of of a polymer or copolymer to be used in accordance with the invention, flotation was carried out for 7 minutes in a Denver laboratory flotation cell. The solids component in the overflow from the flotation cell was filtered off, dried at 105° C. to constant weight and weighed. The results are shown in Table 1.

EXAMPLE 2

Paper stock suspensions

Air-dry paper stock for newspaper and magazines (ratio by weight 1:1) was subjected to printing ink flotation with the chemicals normally used. After flotation of the printing ink, the paper stock suspension had a pulp density of 1% by weight, a temperature of 40° C., a pH value of 9.0 and an ash content of 16% by weight. 0.2 g of a polymer or copolymer to be used in accordance with the invention was added to 9 l of the deinked paper stock suspension having a pulp density of 1% by weight, followed by flotation for 10 minutes in a Denver laboratory flotation cell. After flotation, the paper stock was freed from water in paper filters, dried at 105° C. to constant weight and its ash content determined in accordance with DIN 54 371. The results are shown in Table 2.

TABLE 1

| Polymers or copolymers used | Fillers used | Filler from the overflow in % by weight |
|---|---|---|
| Polymer I | Kaolin | 54 |
|  | CaCO$_3$ | 92 |
|  | Kaolin/CaCo$_3$** | 73 |
| Polymer II | CaCO$_3$ | 82 |
| Copolymer I | Kaolin | 60 |
|  | CaCo$_3$ | 82 |
|  | Kaolin/CaCO$_3$** | 69 |
| Copolymer II | Kaolin | 77 |
|  | CaCO$_3$ | 86 |
|  | Kaolin/CaCO$_3$** | 81 |

**)Mixture of 70% by weight Kaolin and 30% by weight CaCO$_3$

TABLE 2

| Phosphoric acid ester used | Filler content after flotation in the paper in % by weight |
|---|---|
| Polymer I | 6.5 |
| Copolymer I | 6.2 |
| Copolymer II | 5.8 |

We claim:

1. A process for the removal of fillers from wastepaper, wherein, after flotation of the printing ink, at least partly water-soluble polymers, copolymers, or both polymers and copolymers having number average molecular weights in the range from 1,000 to 500,000, and prepared by polymerization or copolymerization of monomers containing amino groups or by reaction of polymers containing carboxyl, ester, or anhydride groups with amino alcohols or diamines are added to the aqueous wastepaper stock suspensions in a total quantity of from 0.1 to 8 g/kg or air-dry paper stock, followed by flotation.

2. A process as claimed in claim 1, wherein the polymers, copolymers, or both polymers and copolymers are added to the paper stock suspensions in a total quantity of 1 to 4 g/kg of air-dry paper stock.

3. A process as claimed in claim 2, wherein the polymers, copolymers, or both polymers and copolymers are prepared by polymerization of:

(A) monomers containing amino groups corresponding to general formula I:

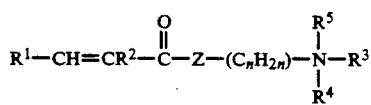

in which R$^1$ and R$^2$ represent hydrogen or methyl; R$^3$ and R$^4$ represent hydrogen or a C$_{1-4}$ alkyl radical or a piperazine, piperidine, or morpholine group; R$^5$ is a linear or branched C$_{1-22}$ alkyl radical, with the proviso that the counterion to the ammonium function is a halogen, sulfate, phosphate, borate or organic acid anion, or R$^5$ is an electron pair; Z represents O or NH; and n is a number of 2 to 5, or by copolymerization of monomers as recited in part (A) with (B1) monomeric, unsaturated acids corresponding to general formula II:

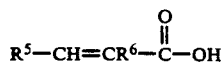

in which R$^5$ and R$^6$ each represent a hydrogen atom or a methyl group, or (B2) monomeric, unsaturated carboxylic acid esters corresponding to general formula III:

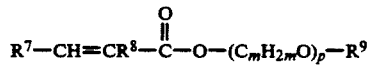

in which R$^7$ and R$^8$ each represent a hydrogen atom or a methyl group, R$^9$ is a linear or branched C$_{1-22}$ alkyl group, m is a number of 2 to 4, and p is a number of 9 to 18, with the proviso that, where p=0, the content of unsaturated carboxylic acid esters in the copolymer does not exceed 30% by weight, or (B3) acrylamides or methacrylates which optionally are substituted at the amide nitrogen atoms by linear or branched or both linear and branched C$_{1-22}$ alkyl radicals, or (B4) N-vinyl pyrrolidone, or (B5) mixtures of any two or more of items (B1)–(B4).

4. A process as claimed in claim 2, wherein the polymers, copolymers, or both are prepared by reaction of polymers containing carboxyl groups; ester groups corresponding to the general formula —COOR, in which R is a C$_{1-8}$ alkyl group or an aromatic group; or —CO—O—CO— groups with - based on the total of the carboxyl, ester, and latent carboxyl groups present in the polymers (D1) 0 to 1 equivalent of amino alcohols corresponding to general formula IV

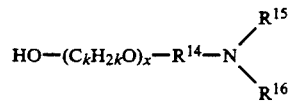

in which R$^{14}$ is a C$_{1-8}$ alkyl group or an aromatic group; R$^{15}$ and R$^{16}$ are the same or different and represent C$_{1-4}$ alkyl groups or aromatic groups, or R$^{15}$ and R$^{16}$ together represent CH$_2$CH$_2$—O—CH$_2$CH$_2$; k=2, 3, or 4 and may be the same or different in each of the x (C$_k$H$_{2k}$O) units present; and x is a number of 0 to 10, (D2) 0 to 1 equivalent of diamines corresponding to general formula V

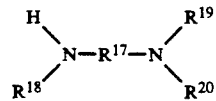

in which R$^{17}$ is a C$_{1-8}$ alkyl group or an aromatic group; R$^{18}$ is H or a C$_{1-4}$ alkyl group; and R$^{19}$ and R$^{20}$ may be the same or different and represent C$_{1-4}$ alkyl groups, or R$^{19}$ and R$^{20}$ together represent —CH=CH—N=CH—, (D3) 0 to 0.5 equivalent of alcohols corresponding to general formula VI

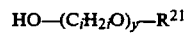

in which $R^{21}$ is a $C_{6-22}$ alkyl group or an aromatic group; i=2, 3, or 4 and may be the same or different in each of the y ($C_iH_{2i}O$) units present; and y is a number of 0 to 30, and (D4) 0 to 0.5 equivalent of amines corresponding to general formula VII

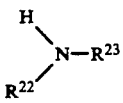

in which $R^{22}$ is H or a $C_{1-4}$ alkyl group and $R^{23}$ is a $C_{6-22}$ alkyl group or an aromatic group, with the proviso that the sum of the equivalents or components (D1) and (D2) is not 0.

5. A process as claimed in claim 1, wherein the at least partly water-soluble polymers, copolymers, or both polymers and copolymers have number average molecular weights in the range from 1,000 to 200,000.

6. A process as claimed in claim 5, wherein the polymers, copolymers, or both polymers and copolymers are prepared by polymerization of (A) monomers containing amino groups corresponding to general formula I

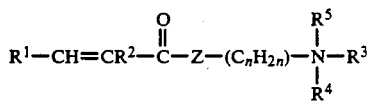

in which $R^1$ and $R^2$ represent hydrogen or methyl; $R^3$ and $R^4$ represent hydrogen or a $C_{1-4}$ alkyl radical or a piperazine, piperidine, or morpholine group; $R^5$ is a linear or branched $C_{1-22}$ alkyl radical, with the proviso that the counterion to the ammonium function is a halogen, sulfate, phosphate, borate or organic acid anion, or $R^5$ is an electron pair; Z represents O or NH; and n is a number of 2 to 5, or by copolymerization of monomers as recited in part (A) with (B1) monomeric, unsaturated acids corresponding to general formula II

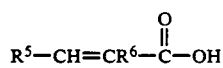

in which $R^5$ and $R^6$ each represent a hydrogen atom or a methyl group, or (B2) monomeric, unsaturated carboxylic acid esters corresponding to general formula III

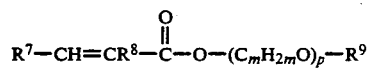

wherein $R^7$ and $R^8$ each represent a hydrogen atom or a methyl group, $R^9$ is a linear or branched $C_{1-22}$ alkyl group, m is a number of 2 to 4, and p is a number of 0 to 18, with the proviso that, where p=0, the content of unsaturated carboxylic acid esters in the copolymer does not exceed 30% by weight, or (B3) acrylamides or methacrylamides which optionally are substituted at the amide nitrogen atoms by linear or branched or both linear and branched $C_{1-22}$ alkyl radicals, or (B4) N-vinyl pyrrolidone, or (B5) mixtures of any two or more of items (B1) - (B4).

7. A process as claimed in claim 6, wherein, in general formula I, $R^1$ is hydrogen; $R^2$ is hydrogen or methyl; $R^3$ and $R^4$ are methyl or ethyl; $R^5$ represents an electron pair or $R^5$ is a $C_{1-4}$ alkyl group, with the proviso that the counterion to the ammonium function is a halogen ion; and in general formula III, $R^9$ is a linear or branched $C_{1-8}$ alkyl group.

8. A process as claimed in claim 7, wherein at least partly water-soluble polymers, copolymers, or both polymers and copolymers of the types recited in claim 7 are added to the paper stock suspensions in combination with a second component consisting of at least partly water-soluble polymers that are selected from the group consisting of polyethylene imines; copolymers containing ethylene imines; polymers and copolymers of 2-vinyl pyridine, 4-vinyl pyridine, and 1-vinyl imidazole; polysaccharides and heteropolysaccharides containing primary, secondary, tertiary or quaternary amino groups; proteins; and mixtures of any two or more of these types of polymers and that have a number average molecular weights of 2,000 to 500,000, the ratio by weight of the total of the polymers and copolymers of the types recited in claim 5 to said second component being from 10:1 to 1:10.

9. A process as claimed in claim 6, wherein at least partly water-soluble polymers, copolymers, or both polymers and copolymers of the types recited in claim 6 are added to the paper stock suspensions in combination with a second component consisting of at least partly water-soluble polymers that are selected from the group consisting of polyethylene imines; copolymers containing ethylene imines; polymers and copolymers of 2-vinyl pyridine, 4-vinyl pyridine, and 1-vinyl imidazole; polysaccharides and heteropolysaccharides containing primary, secondary, tertiary or quaternary amino groups; proteins; and mixtures of any two or more of these types of polymers and that have a number average molecular weights of 2,000 to 500,000, the ratio by weight of the total of the polymers and copolymers of the types recited in claim 4 to said second component being from 10:1 to 1:10.

10. A process as claimed in claim 5, wherein the polymers, copolymers, or both are prepared by reaction of polymers containing carboxyl groups; ester groups corresponding to the general formula —COOR, in which R is $C_{1-8}$ alkyl group or an aromatic group; or —CO—O—CO— groups with - based on the total of the carboxyl, ester, and latent carboxyl groups present in the polymers (D1) 0 to 1 equivalent of amino alcohols corresponding to general formula IV

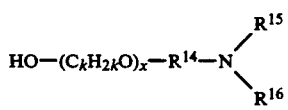

in which $R^{14}$ is a $C_{1-8}$ alkyl group or an aromatic group; $R^{15}$ and $R^{16}$ are the same or different and represent $C_{1-4}$ alkyl groups or aromatic groups, or $R^{15}$ and $R^{16}$ together represent $CH_2CH_2$—O—$CH_2CH_2$; k=2, 3, or 4 and may be the same or different in each of the x ($C_kH_{2k}O$) units present; and x is a number of 0 to 10, (D2) 0 to 1 equivalent of diamines corresponding to general formula V

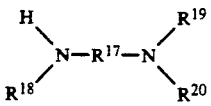

in which $R^{17}$ is a $C_{1-8}$ alkyl group or an aromatic group; $R^{18}$ is H or a $C_{1-4}$ alkyl group; and $R^{19}$ and $R^{20}$ may be the same or different and represent $C_{1-4}$ alkyl groups, or $R^{19}$ and $R^{20}$ together represent —CH=CH—N=CH—, (D3) 0 to 0.5 equivalent of alcohols corresponding to general formula VI

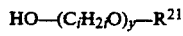

in which $R^{21}$ is a $C_{6-22}$ alkyl group or an aromatic group; i=2, 3, or 4 and may be the same or different in each of the y ($C_iH_{2i}O$) units present; and y is a number of 0 to 30, and (D4) 0 to 0.5 equivalent of amines corresponding to general formula VII

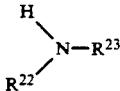

in which $R^{22}$ is H or a $C_{1-4}$ alkyl group and $R^{23}$ is a $C_{6-22}$ alkyl group or an aromatic group, with the proviso that the sum of the equivalents of components (D1) and (D2) is not 0.

11. A process as claimed in claim 10, wherein the polymers prepared by reaction of polymers containing carboxyl, ester, or anhydride groups are reacted with a total of items (D1) - (D4) that includes from 0.7 to 1 equivalent of the total of items (D1) and (D2) and not more than 0.2 equivalent from each of components (D3) and (D4) - based on the total of the carboxyl, ester and latent carboxyl groups present in the polymers.

12. A process as claimed in claim 11, wherein the polymers containing carboxyl, ester, or anhydride groups contain structural units corresponding to at least one of the general formulae:

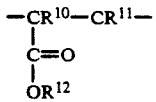

and

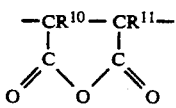

and

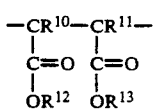

in which $R^{10}$ and $R^{11}$ may be the same or different and represent H or a methyl group and $R^{12}$ and $R^{13}$ may be the same or different and represent H, a $C_{1-8}$ alkyl group or an aromatic group.

13. A process as claimed in claim 12, wherein the polymers containing carboxyl, ester, or anhydride groups contain structural units corresponding to general formula (C1).

14. A process as claimed in claim 13, wherein at least partly water-soluble copolymers of the types recited in claim 4 are added to the paper stock suspensions in combination with a second component consisting of at least partly water-soluble polymers that are selected from the group consisting of polyethylene imines; copolymers containing ethylene imines; polymers and copolymers of 2-vinyl pyridine, 4-vinyl pyridine, and 1-vinyl imidazole; polysaccharides and heteropolysaccharides containing primary, secondary, tertiary or quaternary amino groups; proteins; and mixtures of any two or more of these types of polymers and that have a number average molecular weights of 2,000 to 500,000, the ratio by weight of the copolymers of the types recited in claim 9 to said second component being from 5:1 to 1:5.

15. A process as claimed in claim 12, wherein at least partly water-soluble copolymers of the types recited in claim 8 are added to the paper stock suspensions in combination with a second component consisting of at least partly water-soluble polymers that are selected from the group consisting of polyethylene imines; copolymers containing ethylene imines; polymers and copolymers of 2-vinyl pyridine, 4-vinyl pyridine, and 1-vinyl imidazole; polysaccharides and heteropolysaccharides containing primary, secondary, tertiary or quaternary amino groups; proteins; and mixtures of any two or more of these types of polymers and that have a number average molecular weights of 2,000 to 500,000, the ratio by weight of the copolymers of the types recited in claim 8 to said second component being from 10:1 to 1:10.

16. A process as claimed in claim 11, wherein at least partly water-soluble polymers of the types recited in claim 7 are added to the paper stock suspensions in combination with a second component consisting of at least partly water-soluble polymers that are selected from the group consisting of polyethylene imines; copolymers containing ethylene imines; polymers and copolymers of 2-vinyl pyridine, 4-vinyl pyridine, and 1-vinyl imidazole; polysaccharides and heteropolysaccharides containing primary, secondary, tertiary or quaternary amino groups; proteins; and mixtures of any two or more of these types of polymers and that have a number average molecular weights of 2,000 to 500,000, the ratio by weight of the copolymers of the types recited in claim 8 to said second component being from 10:1 to 1:10.

17. A process as claimed in claim 10, wherein at least partly water-soluble polymers, copolymers, or both polymers and copolymers of the types recited in claim 6 are added to the paper stock suspensions in combination with a second component consisting of at least partly water-soluble polymers that are selected from the group consisting of polyethylene imines; copolymers containing ethylene imines; polymers and copolymers of 2-vinyl pyridine, 4-vinyl pyridine, and 1-vinyl imidazole; polysaccharides and heteropolysaccharides containing primary, secondary, tertiary or quaternary amino groups; proteins; and mixtures of any two or more of these types of polymers and that have a number average molecular weights of 2,000 to 500,000, the ratio by weight of the total of the polymers and copolymers of the types recited in claim 10 to said second component being from 10:1 to 1:10.

18. A process as claimed in claim 5, wherein the at least partly water-soluble polymers, copolymers, or both polymers and copolymers have number average molecular weights in the range from 1,000 to 100,000.

19. A process as claimed in claim 1, wherein the polymers, copolymers, or both polymers and copolymers are prepared by polymerization of:

(A) monomers containing amino groups corresponding to general formula I:

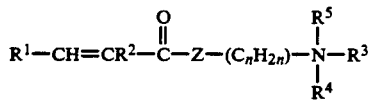

in which $R^1$ and $R^2$ represent hydrogen or methyl; $R^3$ and $R^4$ represent hydrogen or a $C_{1-4}$ alkyl radical or a piperazine, piperidine, or morpholine group; $R^5$ is a linear or branched $C_{1-22}$ alkyl radical, with the proviso that the counterion to the ammonium function is a halogen, sulfate, phosphate, borate or organic acid anion, or $R^5$ is an electron pair; Z represents O or NH; and n is a number of 2 to 5, or by copolymerization of monomers as recited in part (A) with (B1) monomeric, unsaturated acids corresponding to general formula II:

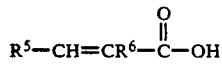

in which $R^5$ and $R^6$ each represent a hydrogen atom or a methyl group, or (B2) monomeric, unsaturated carboxylic acid esters corresponding to general formula III:

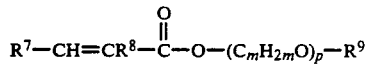

in which $R^7$ and $R^8$ each represent a hydrogen atom or a methyl group, $R^9$ is a linear or branched $C_{1-22}$ alkyl group, m is a number of 2 to 4, and p is a number of 0 to 18, with the proviso that, where p=0, the content of unsaturated carboxylic acid esters in the copolymer does not exceed 30% by weight, or (B3) acrylamides or methacrylamides which optionally are substituted at the amide nitrogen atoms by linear or branched or both linear and branched $C_{1-22}$ alkyl radicals, or (B4) N-vinyl pyrrolidone, or (B5) mixtures of any two or more of items (B1)–(B4).

20. A process as claimed in claim 1, wherein the polymers, copolymers, or both are prepared by reaction of polymers containing carboxyl groups; ester groups corresponding to the general formula —COOR, in which R is a $C_{1-8}$ alkyl group or an aromatic group; or —CO—O—CO— groups with - based on the total of the carboxyl, ester, and latent carboxyl groups present in the polymers (D1) 0 to 1 equivalent of amino alcohols corresponding to general formula IV

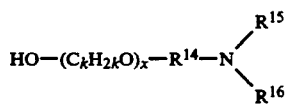

in which $R^{14}$ is a $C_{1-8}$ alkyl group or an aromatic group; $R^{15}$ and $R^{16}$ are the same or different and represent $C_{1-4}$ alkyl groups or aromatic groups, or $R^{15}$ and $R^{16}$ together represent $CH_2CH_2$—O—$CH_2CH_2$; k=2, 3, or 4 and may be the same or different in each of the x ($C_kH_{2k}O$) units present; and x is a number of 0 to 10, (D2) 0 to 1 equivalent of diamines corresponding to general formula V

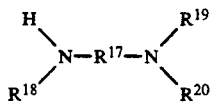

in which $R^{17}$ is a $C_{1-8}$ alkyl group or an aromatic group; $R^{18}$ is H or a $C_{1-4}$ alkyl group; and $R^{19}$ and $R^{20}$ may be the same or different and represent $C_{1-4}$ alkyl groups, or $R^{19}$ and $R^{20}$ together represent —CH=CH—N=CH—, (D3) 0 to 0.5 equivalent of alcohols corresponding to general formula VI

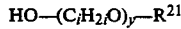

in which $R^{21}$ is a $C_{6-22}$ alkyl group or an aromatic group; i=2, 3, or 4 and may be the same or different in each of the y ($C_iH_{2i}O$) units present; and y is a number of 0 to 30, and (D4) 0 to 0.5 equivalent of amines corresponding to general formula VII

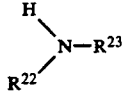

in which $R^{22}$ is H or a $C_{1-4}$ alkyl group and $R^{23}$ is a $C_{6-22}$ alkyl group or an aromatic group, with the proviso that the sum of the equivalents of components (D1) and (D2) is not 0.

* * * * *